UNITED STATES PATENT OFFICE.

THOMAS BURNS McGHIE, OF LONDON, ENGLAND, ASSIGNOR OF ONE-HALF TO THOMAS BARTON, OF LONDON, ENGLAND.

PROCESS FOR TREATING ORES CONTAINING ARSENIC.

No. 885,071.  Specification of Letters Patent.  Patented April 21, 1908.

Application filed September 9, 1907. Serial No. 392,049.

*To all whom it may concern:*

Be it known that I, THOMAS BURNS MC-GHIE, metallurgist, a subject of the King of Great Britain, residing at 9 Gracechurch street, in the city and county of London, England, have invented a new and useful Process for Treating Ores Containing Arsenic, of which the following is a specification.

The present invention relates to improvements in the treatment of arsenical minerals and the partly smelted substances known as "speiss" products.

The problem of the treatment of minerals containing metals associated with arsenic is the economical separation of the arsenic from the other ingredients without injurious results. Arsenical fumes are so difficult to condense on a large scale and so deleterious to the workmen and the surrounding country that the presence of arsenic in many ores constitutes a great practical drawback to their profitable utilization.

This invention has for its object a simple method of separating the arsenic from the other ingredients by which practically the whole of the arsenic is obtained in a form very suitable for industrial utilization while on the other hand the residual substances are left in a good condition for further treatment. Few arsenical minerals are sufficiently free from gangue to admit of the profitable direct application of the present process; and in order to obtain products of a uniform character and specially suited to the operation of this method, a preliminary smelting is desirable. The effect of this smelting will be that the iron and other metals present are partly separated with the arsenic in the form of "speiss". There are, however, instances in which a native mineral occurs which is a sufficiently pure arsenic to admit of direct treatment without any preliminary smelting.

The process according to the present invention is conducted substantially as follows. The mineral or "speiss" is first ground to fine powder and this should be sifted to eliminate any metallic particles or coarse fragments. The resulting material in fine powder is then intimately mixed with a sufficiency of soda ash or other suitable form of sodium carbonate, in such proportions that a slight excess of alkali will be present after allowing for the combination with all the arsenic present. The mixture is then carefully roasted in a suitable calcining furnace until the whole of the arsenic has become oxidized and has combined with the alkali, forming anhydrous arseniate of soda, the iron and other metals present formerly combined with the arsenic becoming oxidized likewise. The course of the operation in the calcining furnace may be explained briefly in the following way: Assuming for instance that the ore consists of diarsenid of iron $FeAs_2$, this when heated will probably become reduced to $Fe_3As_2$ and arsenic will be liberated. No volatilization of the arsenic takes place at any stage in the process, but the arsenic will be oxidized in the presence of hot air, and by contact with the soda it will form sodium arsenite $(Na_2O)_3As_2O_3$. This rapidly takes up more oxygen and becomes sodium arseniate $(Na_2O)_3As_2O_5$. The sodium arseniate formed in the early stages of the process then reacts in all probability with some of the reduced arsenid of iron $Fe_3As_2$ so as to form ferrous arsenite $(FeO)_3As_2O_3$, while the sodium arseniate in contact becomes reduced to arseniate and is probably at once reoxidized by the air present. The ferrous arsenite, the formation of which seems probable as an intermediate product, then absorbs oxygen giving $Fe_2O_3$ and $Fe_3O_4$ while $As_2O_3$ is formed; this latter is at once fixed by the soda and further oxidized by atmospheric oxygen to give sodium arseniate, $(Na_2O)_3 As_2O_5$ which is the final product. It will be understood that this is only the probable course of the reaction and it will be modified according to the condition of affairs in the furnace, and according to the metals present. For instance if the metals were cobalt and nickel, the resulting metallic oxids would probably be the protoxids, for the higher oxids of these metals are not produced in the roasting operation. In every case, however, the arsenic will be converted ultimately into a soluble alkaline arseniate. When this combination of the arsenic with the alkali has taken place, the roasted product is leached and thoroughly washed with water, and practically the whole of the arsenic is dissolved out as arseniate of soda. The iron and other metals left in the residue are in the form of partially hydrated oxides. This condition is an ideal one for subsequent chemical solution.

The solution containing arseniate of soda may then be simply boiled in suitable iron or other pans until the evaporation has proceeded far enough to give, on cooling a solidified product. If desired of course the heating may be continued until a crude anhydrous product is obtained, and these products may be purified by recrystallization, or otherwise.

As an example of the process it may be mentioned that from an ore containing about 40% of arsenic, an anhydrous arseniate of soda was obtained, after the roasting and leaching, and this contained 44% of arsenic acid, while the dried residual oxids retained only 2% of arsenic. The results will vary of course with the ore treated.

What I claim is:

1. Process for recovering arsenic from ores and speiss, consisting in mixing material containing alkaline carbonate with the material containing the arsenic, roasting the mixture in the presence of air, and dissolving out from the product the resulting salt consisting of the alkaline arseniate.

2. Process for recovering arsenic from ores and speiss, consisting in reducing the material containing the arsenic to the form of a powder, mixing material containing alkaline carbonate with the material containing the arsenic, roasting the mixture, and dissolving out from the product, the resulting salt containing the arsenic.

3. Process for recovering arsenic from ores and speiss, consisting in mixing material containing alkaline carbonate with the material containing the arsenic in such quantity that there is a slight excess of alkaline material beyond the quantity required to combine with all the arsenic present, roasting the mixture, and dissolving out from the product the resulting salt containing the arsenic.

4. Process for recovering arsenic from ores and speiss, consisting in reducing the material containing the arsenic to the form of a powder, mixing material containing alkaline carbonate with the material containing the arsenic in such quantity that there is a slight excess of alkaline material beyond the quantity required to combine with all the arsenic present, roasting the mixture, and dissolving out from the product the resulting salt containing the arsenic.

5. Process for recovering arsenic from ores and speiss, consisting in mixing material containing sodium carbonate with the material containing the arsenic, roasting the mixture, and leaching the product whereby the resulting arseniate of soda is dissolved out.

6. Process for recovering arsenic from ores and speiss, consisting in mixing material containing sodium carbonate with the material containing the arsenic, roasting the mixture whereby the arsenic is caused to combine with the sodium as arseniate of soda while the metals present in the original material are oxidized, leaching and then thoroughly washing the product whereby the bulk of the arsenic is recovered and the residue is left with the metals in the form of partly hydrated oxids.

7. Process for recovering arsenic from ores and speiss, consisting in mixing material containing alkaline carbonate with the material containing the arsenic, roasting the mixture, dissolving out from the product the resulting salt containing the arsenic, and recovering the arsenic from the solution thus obtained by evaporating it down and allowing the arseniate salt to solidify.

8. Process for recovering arsenic from ores and speiss, consisting in mixing material containing sodium carbonate with the material containing the arsenic, roasting the mixture, dissolving out from the product the resulting arseniate of soda, and recovering the arsenic from the solution thus obtained by evaporating it down and allowing the sodium arseniate to solidify.

9. Process for recovering arsenic from ores and speiss, consisting in mixing ground soda ash with the material containing the arsenic, roasting the mixture, and leaching the product whereby the resulting arseniate of soda is dissolved out.

In testimony whereof I have signed my name to this specification in the presence of two subscribing witnesses.

T. BURNS McGHIE.

Witnesses:
HUBERT A. GILL,
A. E. O'DELL.